US008677786B2

(12) United States Patent
Song et al.

(10) Patent No.: US 8,677,786 B2
(45) Date of Patent: Mar. 25, 2014

(54) SOFT WATER FORMING DEVICE AND WASHING MACHINE INCLUDING THE SAME

(75) Inventors: Tae-won Song, Yongin-si (KR); Hyo-rang Kang, Anyang-si (KR); Ho-jung Yang, Suwon-si (KR); Chang-hyun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1099 days.

(21) Appl. No.: 12/469,959

(22) Filed: May 21, 2009

(65) Prior Publication Data

US 2010/0132414 A1 Jun. 3, 2010

(30) Foreign Application Priority Data

Dec. 2, 2008 (KR) .................. 10-2008-0121279

(51) Int. Cl.
*C02F 1/469* (2006.01)
*D06F 29/00* (2006.01)

(52) U.S. Cl.
USPC .............................. 68/13 A; 68/3 R; 204/672

(58) Field of Classification Search
USPC .................... 68/3 R, 13 A; 204/672
See application file for complete search history.

(56) References Cited

U.S. PATENT DOCUMENTS 3,530,691 A * 9/1970 Borochaner .................. 68/13 A
4,066,393 A * 1/1978 Morey et al. .................. 8/137
6,557,382 B1 * 5/2003 Koike et al. .................. 68/17 R
6,886,371 B2 * 5/2005 Arai et al. .................. 68/3 R
7,083,733 B2 * 8/2006 Freydina et al. ............. 210/739
2002/0134117 A1 * 9/2002 Arai et al. .................. 68/3 SS
2005/0103622 A1 * 5/2005 Jha et al. .................. 204/237
2006/0130533 A1 * 6/2006 Ooe et al. .................. 68/3 R
2007/0000292 A1 * 1/2007 Park et al. .................. 68/13 A

FOREIGN PATENT DOCUMENTS

| JP | 10-300235 A | 11/1998 |
|---|---|---|
| JP | 2001259291 A | 9/2001 |
| JP | 2003245667 A | 9/2003 |
| KR | 1019950018848 B1 | 6/1995 |
| KR | 100175853 B1 | 11/1998 |
| KR | 1020000045174 A | 7/2000 |
| KR | 1020050028831 A | 3/2005 |
| KR | 1020070001665 A | 1/2007 |
| KR | 100785052 B1 | 12/2007 |

OTHER PUBLICATIONS

Korean Office Action with English Translation for Application No. 10-2008-0121279 dated Nov. 4, 2010.

* cited by examiner

*Primary Examiner* — Michael Barr
*Assistant Examiner* — Benjamin L Osterhout
(74) *Attorney, Agent, or Firm* — Cantor Colburn LLP

(57) ABSTRACT

A soft water forming device includes; a capacitive deionization stack ("CDI") stack including at least one anode and at least one cathode that are separately and alternately stacked to adsorb ions contained in water, and a pumping unit which pumps one of water supplied to the CDI stack and water which has passed through the CDI stack, the pumping unit including; a casing have a water inlet and a water outlet and a rotor which rotates due to motive power supplied by an external motor and pumps the water supplied into the casing.

14 Claims, 12 Drawing Sheets

SOFT WATER FORMING DEVICE AND WASHING MACHINE INCLUDING THE SAME

CROSS-REFERENCE TO RELATED APPLICATIONS

This application claims priority to Korean Patent Application No. 10-2008-0121279, filed on Dec. 2, 2008, and all the benefits accruing therefrom under 35 U.S.C. §119, the contents of which in its entirety are herein incorporated by reference.

BACKGROUND

1. Field

One or more exemplary embodiments relate to a soft water forming device converting water supplied from a water source, such as a city water source, to soft water, and a washing machine including the soft water forming device.

2. Description of the Related Art

Water containing a large concentration of calcium ions or magnesium ions is often referred to as hard water, and water containing such ions in a smaller concentration is often referred to as soft water. Components like the calcium ions and magnesium ions contained in the hard water cause the water to become slick and to form precipitations and exhibit a resistance to the foaming action of soap. Accordingly, soap cannot easily melt within the hard water. Also, salts in the calcium ions or the magnesium ions are not easily dissolved in water at high temperature and are deposited at the bottom. Thus, when hard water is used in a boiler, precipitations generated at high temperature are accumulated on walls of pipes of the boiler, thereby decreasing the efficiency of the boiler. Also, when a person drinks hard water for a long time, the person may suffer from stomachache or diarrhea.

A device that eliminates calcium and magnesium ions from hard water to form soft water is referred to a soft water forming device. However, when water is passed through the soft water forming device, the water pressure is susceptible to a pressure drop. Accordingly, the efficiency of the water softening process decreases and convenience in using soft water is reduced.

SUMMARY

One or more exemplary embodiments include a soft water forming device which prevents a pressure drop of discharged soft water, thereby increasing the efficiency thereof and the water softening process, and a washing machine including the soft water forming device.

Additional aspects will be set forth in part in the description which follows and, in part, will be apparent from the description, or may be learned by practice of the invention.

An exemplary embodiment of a soft water forming device includes; a capacitive deionization ("CDI") stack including at least one anode and at least one cathode which are separately and alternately stacked to adsorb ions contained in water, and a pumping unit which pumps one of water supplied to the CDI stack and water which has passed through the CDI stack, the pumping unit includes; a casing having a water inlet and a water outlet, and a rotor which rotates due to motive power supplied by an external motor and pumps the water supplied into the casing.

An exemplary embodiment of a soft water forming device includes; a housing having a water inlet and a water outlet, a plurality of blades which are arranged in the housing, rotate due to motive power supplied by an external motor, and pump water supplied into the housing, and a CDI stack that is arranged in the housing and includes at least one anode and at least one cathode that are separately and alternately stacked to adsorb ions contained in the water.

In one exemplary embodiment, the anodes and the cathodes may be flat plates, and a normal line of the flat plates is one of substantially parallel to an axis line around which the blades rotate and substantially perpendicular to the axis line around which the blades rotate.

In one exemplary embodiment, the CDI stack may be arranged in one of a configuration between the plurality of the blades and a configuration outside the plurality of the blades.

In one exemplary embodiment, the water outlet may be arranged away from the axis line around which the blades rotate, compared to the water inlet.

Another exemplary embodiment of a soft water forming device includes; at least one soft water forming unit including; a housing having a water inlet and a water outlet; a cylinder arranged in the housing, a piston which is arranged in the cylinder and which pumps water that is supplied into the cylinder to discharge the water outside the cylinder, and a CDI stack which is arranged outside the cylinder and includes at least one anode and at least one cathode separately and alternately stacked to adsorb ions contained in the water, and a power transmitting unit which reciprocally moves the piston via an external motor.

Exemplary embodiments include configurations wherein a plurality of openings, through which the water pumped in the cylinder are discharged, may be formed on an outer circumferential surface of the cylinder.

In one exemplary embodiment, the inlet may be directly connected to the cylinder.

In one exemplary embodiment, a planar area of at least one of the anode and cathode disposed closer to the inlet may be larger than or equal to a planar area of at least one additional anode or cathode disposed a greater distance away from the inlet.

Exemplary embodiments include configurations wherein a plurality of openings, through which water pumped in the cylinder is discharged, may be formed on an outer circumferential surface of the cylinder, and a diameter of an opening disposed closer to the inlet may be greater than or equal to a diameter of an opening disposed a greater distance away from the inlet.

In one exemplary embodiment, the soft water forming device includes a plurality of the soft water forming units, and the plurality of soft water forming units may be arranged substantially linearly.

In one exemplary embodiment, an outlet of one soft water forming unit and an inlet of another soft water forming unit that is disposed adjacent to the one soft water forming unit may be fluidly connected to each other so that water sequentially passes through the plurality of the soft water forming units and is pumped stepwise, and ions are adsorbed sequentially in each of the plurality of soft water forming units.

In one exemplary embodiment, a plurality of soft water forming units may be arranged in radial directions with respect to a rotation center, and the power transmitting unit may include an eccentric protrusion which rotates with respect to the rotation center and a plurality of connection rods individually corresponding to an individual soft water forming unit of the plurality of soft water forming units, wherein a first end of the connection rods is connected to the eccentric protrusion, and a second end of the connection rods is connected to the piston of each of the plurality of soft water forming units.

An exemplary embodiment of a washing machine includes; a washing tub including an internal space accommodating a washing object and water, a main motor which rotates the washing tub, and a soft water forming device as described above, wherein the main motor is the external motor.

BRIEF DESCRIPTION OF THE DRAWINGS

These and/or other aspects, advantages and features of the invention will become more apparent and more readily appreciated from the following description of the exemplary embodiments, taken in conjunction with the accompanying drawings of which.

DETAILED DESCRIPTION

Figure 1:
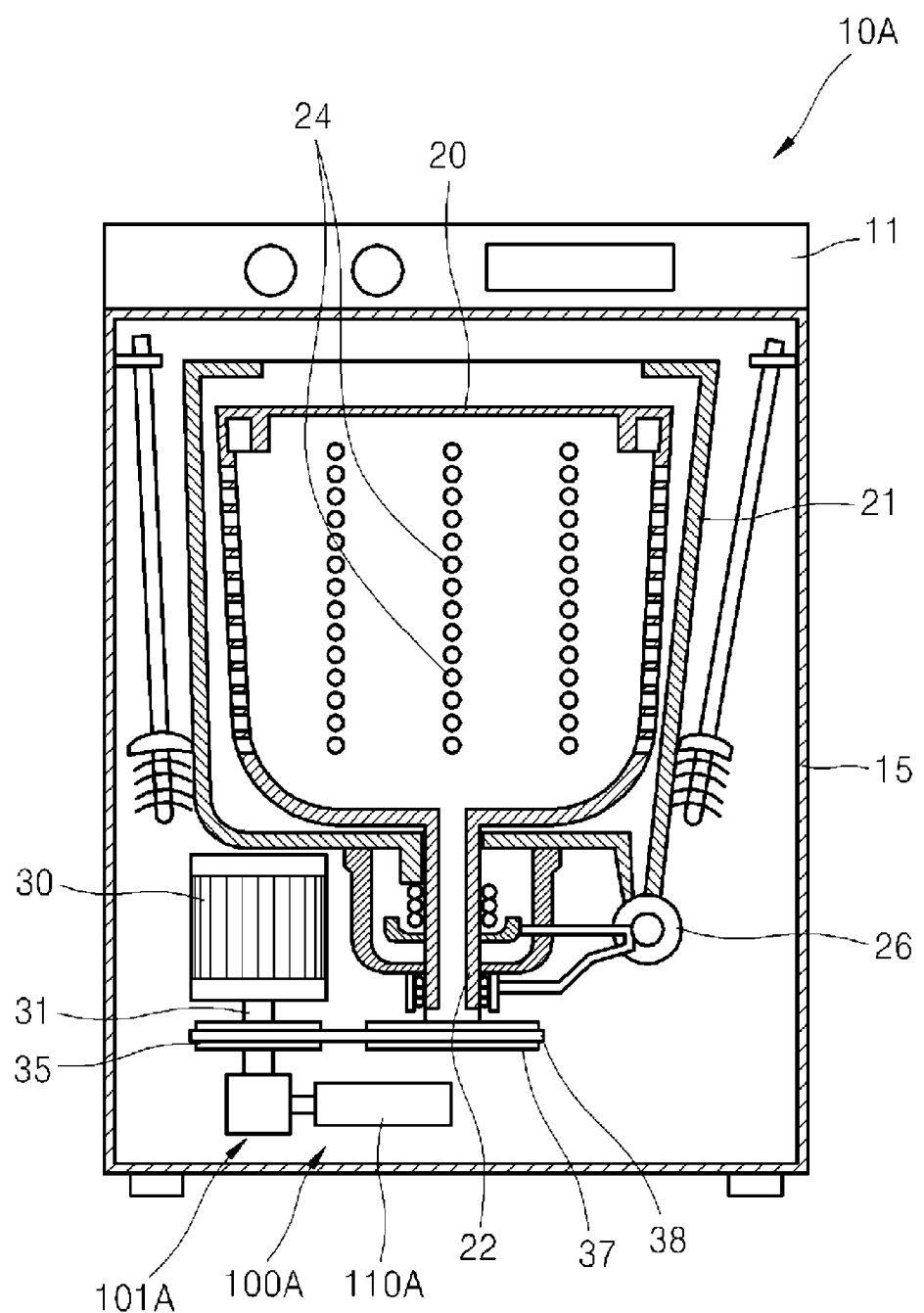
FIG. 1 is a schematic cross-sectional view illustrating an exemplary embodiment of a washing machine.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

FIG. 1 is a schematic view illustrating an exemplary embodiment of a washing machine 10A.

Referring to FIG. 1, the washing machine 10A includes a housing 15, a washing tub 20 formed in the housing 15, and a manipulation plate 11, also referred to as a control panel, including on/off switches and disposed on the frontal area of the housing 10A in order to operate the washing machine 10A. Also, the washing machine 10A includes in the housing 15 a main motor 30 rotating the washing tub 20 and a soft water forming device 100A softening water supplied to the washing tub 20, the soft water forming device 100A including a pumping unit 101A and a soft water forming unit 110A to be described in more detail below.

The washing tub 20 has an internal space accommodating a washing object, e.g., clothes, bedding, etc., and water for washing, and includes a plurality of dehydrating openings 24 on lateral portions of the washing tub 20. An outer bucket 21 surrounding the washing tub 20 is formed outside the washing tub 20, and a discharging valve 26 is mounted in the outer bucket 21. When the discharging valve 26 is closed and water is supplied into the internal space of the washing tub 20, water fills both the washing tub 20 and the outer bucket 21 at the same water level. When the discharging valve 26 is opened, water in the washing tub 20 and the outer bucket 21 is discharged. When the washing tub 20 is rotated after water is discharged, the washing object is dehydrated, e.g., the centripetal force applied to the washing object due to the rotation of the washing tub 20 squeezes the washing object against the lateral portions of the washing tub 20, and water is wrung from the washing object through the dehydrating openings 24.

In one exemplary embodiment, power from the main motor 30 may be transmitted to the washing tub 20 via a belt unit. In detail, the belt unit includes a first wheel 35 that is fixed to a rotational axis 31 of the main motor 30 and rotates coaxially with the rotational axis 31, a second wheel 37 that is fixed to a rotational axis 22 of the washing tub 20 and rotates coaxially with the rotational axis 22, and a first belt 38 that is wound around the first and second wheels 35 and 37 and is supported by the first and second wheels 35 and 37. However, a transmission unit of the main motor 30 is not limited to the belt unit. In one alternative exemplary embodiment, the belt unit may be replaced with a chain unit having a sprocket and a chain. Alternative exemplary embodiments also include configurations wherein the transmission unit may include a gear drive, or a direct connection between the main motor 30 and the washing tub 20.

Figure 2:
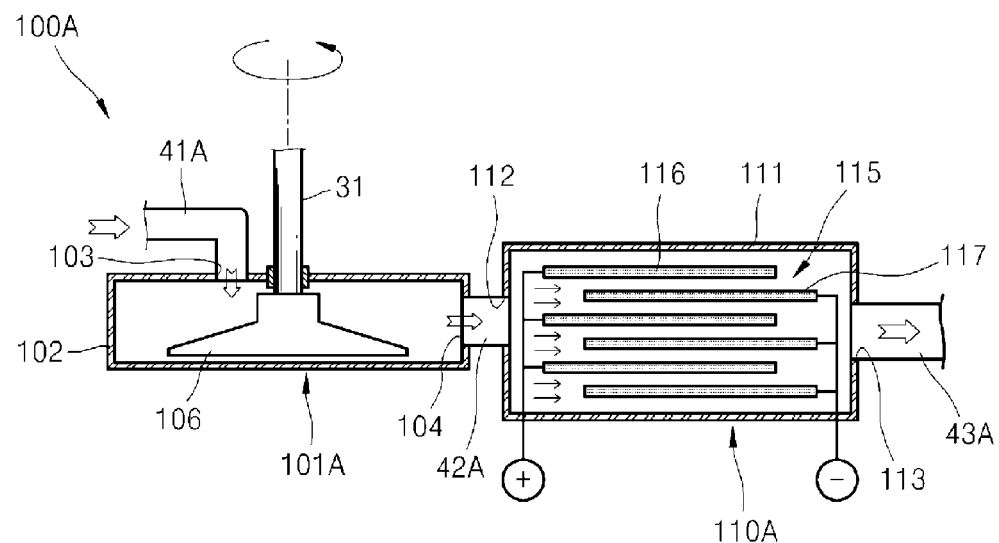
FIG. 2 is a schematic cross-sectional view illustrating an exemplary embodiment of a soft water forming device used in the exemplary embodiment of a washing machine of FIG. 1.
Figure 3:
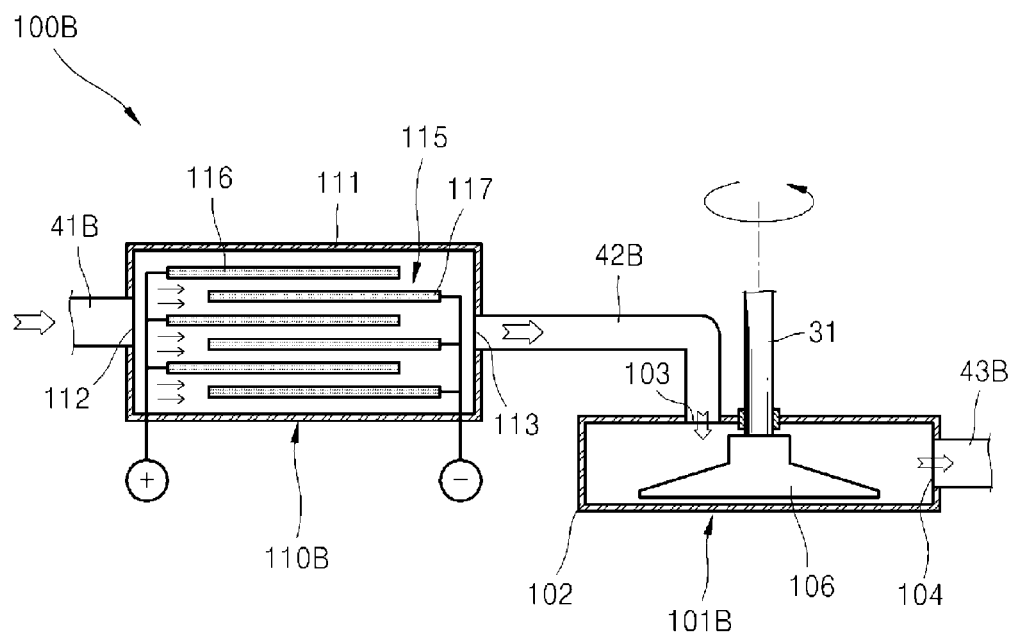
FIG. 3 is a schematic cross-sectional view illustrating another exemplary embodiment of a soft water forming device.

FIG. 2 is a schematic cross-sectional view illustrating an exemplary embodiment of a soft water forming device 100A installed in the washing machine 10A of FIG. 1, and FIG. 3 is a schematic cross-sectional view illustrating another exemplary embodiment of a soft water forming device 100B t.

Referring to FIG. 2, the soft water forming device 100A includes a pumping unit 101A for pumping water, and a soft water forming unit 110A forming soft water. The pumping unit 101A includes a casing 102 having an inlet 103 and an outlet 104 for water and a rotor 106 arranged in the casing 102. The inlet 103 is connected to a supply pipe 41A through which water is supplied from an outside of the washing machine 10A of FIG. 1, and the outlet 104 is connected to a connection pipe 42A supplying water to the soft water forming unit 110A. The rotational axis 31 of the main motor 30 of FIG. 1 is extended into the casing 102 and is coupled to the rotor 106. Accordingly, when the main motor 30 is operating, the rotor 106 rotates due to rotation of the main motor 30 about the rotational axis 31 and pumps the water that has flown into the casing 102. The water pumped in the pumping unit 101A enters the soft water forming unit 110A through the connection pipe 42A.

The soft water forming unit 110A includes a housing 111 having an inlet 112 and an outlet 113, and a capacitive deionization ("CDI") stack 115 inside the housing 111. The inlet 112 is connected to the connection pipe 42A, and the outlet 113 is connected to a discharging pipe 43A. In one exemplary embodiment, water discharged from the soft water forming unit 110A is supplied to the washing tub 20 of FIG. 1 through the discharging pipe 43A. In the present exemplary embodiment, the CDI stack 115 includes a plurality of anodes 117 and cathodes 116 that are alternately and separately stacked. Alternative exemplary embodiments include configurations wherein the CDI stack includes one or more anodes 117 and one or more cathodes 116. As a potential difference is generated between the anodes 117 and the cathodes 116, ions contained in water supplied from the connection pipe 42A are adsorbed toward electrodes having an opposite polarity to the ions, and thus the water is softened.

The exemplary embodiment of a soft water forming device 100B illustrated in FIG. 3 may be used as an alternative to the exemplary embodiment of a soft water forming device 100A of FIG. 2. The soft water forming device 100B of FIG. 3 includes a supply pipe 41B, through which water is supplied from the outside and which is connected to an inlet 112 of the soft water forming unit 110B, and an outlet 113 of the soft water forming unit 110B is connected to a first end of a connection pipe 42B. A second end of the connection pipe 42B is connected to an inlet 103 of a pumping unit 101B, and an outlet 104 of the pumping unit 101B is connected to a discharging pipe 43B. Accordingly, water supplied from outside of the washing machine 10A of FIG. 1 flows into the soft water forming unit 110B through the supply pipe 41B, and softened water is pumped in the pumping unit 101B through the connection pipe 42B and is supplied to the washing tub 20 of FIG. 1 through the discharging pipe 43B.

Figure 4:
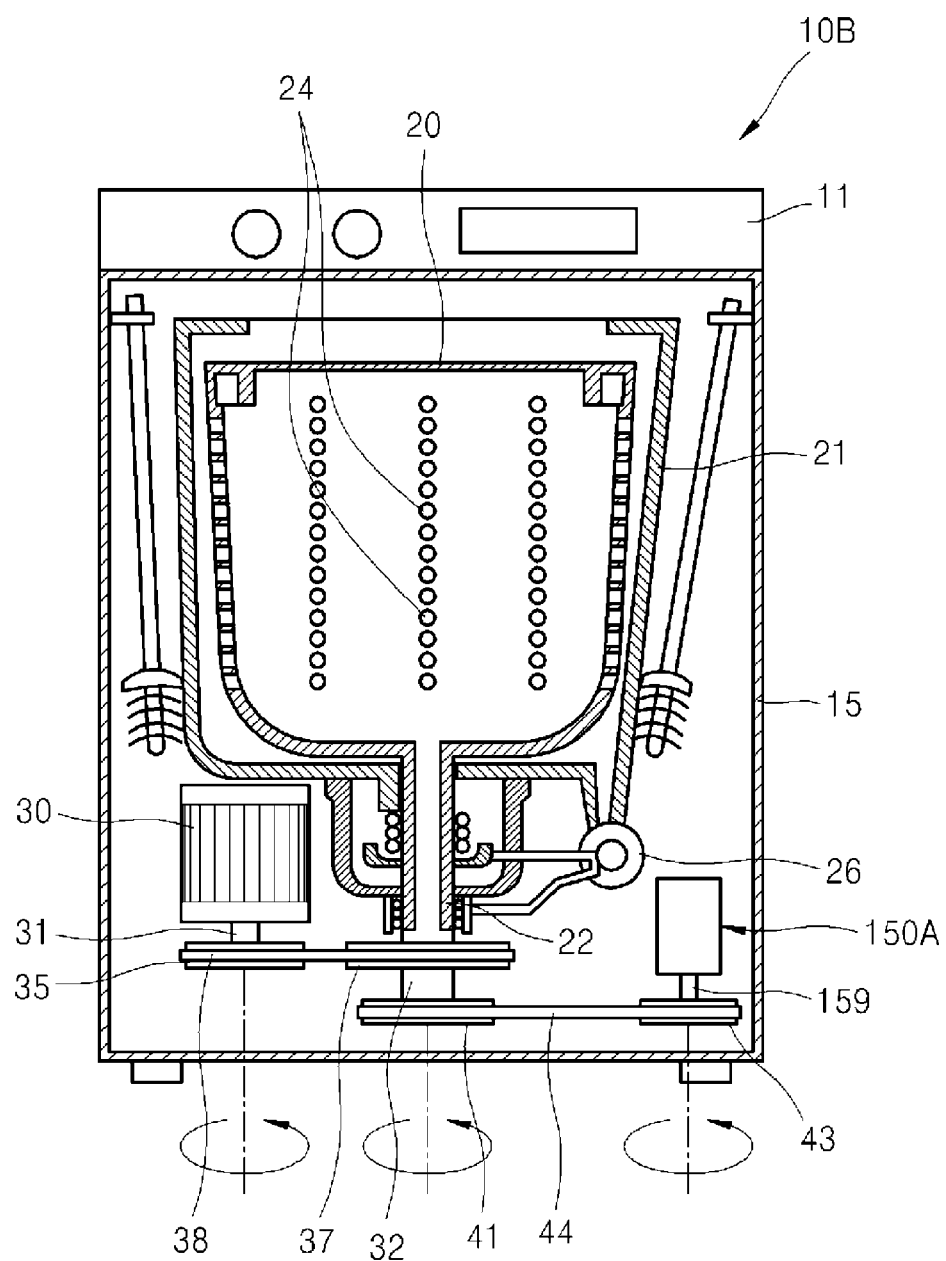
FIG. 4 is a schematic cross-sectional view illustrating another exemplary embodiment of a washing machine.

FIG. 4 is a schematic cross-sectional view illustrating another exemplary embodiment of a washing machine 10B. Referring to FIG. 4, the washing machine 10B includes a manipulation plate 11, also called a control panel, on a front of a housing 155, a washing tub 20 disposed inside the housing 15, an outer bucket 21, a discharging valve 26 and a main motor 30, similar to the previous exemplary embodiment illustrated in FIG. 1. In addition, the present exemplary embodiment includes a soft water forming device 150A.

Power from the main motor 30 may be transmitted to the washing tub 20 via a belt unit. In detail, the belt unit in the present exemplary embodiment includes a first wheel 35 that is fixed to a rotational axis 31 of the main motor 30 and rotates coaxially with the rotational axis 31, a second wheel 37 that is fixed to a rotational axis 22 of the washing tub 20 and rotates coaxially with the rotational axis 22, and a first belt 38 that is wound around the first and second wheels 35 and 37 and is supported by the first and second wheels 35 and 37.

In the present exemplary embodiment, the belt unit further includes a structure transmitting the rotational motive power of the main motor 30 to the soft water forming device 150A. In detail, the belt unit further includes a third wheel 41 that is fixed to an extension portion 32 of the rotational axis 22 of the washing tub 20 and rotates coaxially with the rotational axis 22, a fourth wheel 43 that is fixed to a rotational axis 159 connected to the soft water forming device 150A and rotates coaxially with the rotational axis 159, and a second belt 44 that winds the third and fourth wheels 41 and 43 and is supported by the third and fourth wheels 41 and 43. Accordingly, when the rotational axis 31 of the main motor 30 rotates, the rotational axis 22 of the washing tub 20 and the rotational axis 159 connected to the soft water forming device 150A are also rotated via the belt unit. Meanwhile, a transmission unit of the main motor 30 is not limited to the illustrated belt unit. Exemplary embodiments also include configurations wherein the belt unit may be replaced with a chain unit having a sprocket and a chain.

Figure 5:
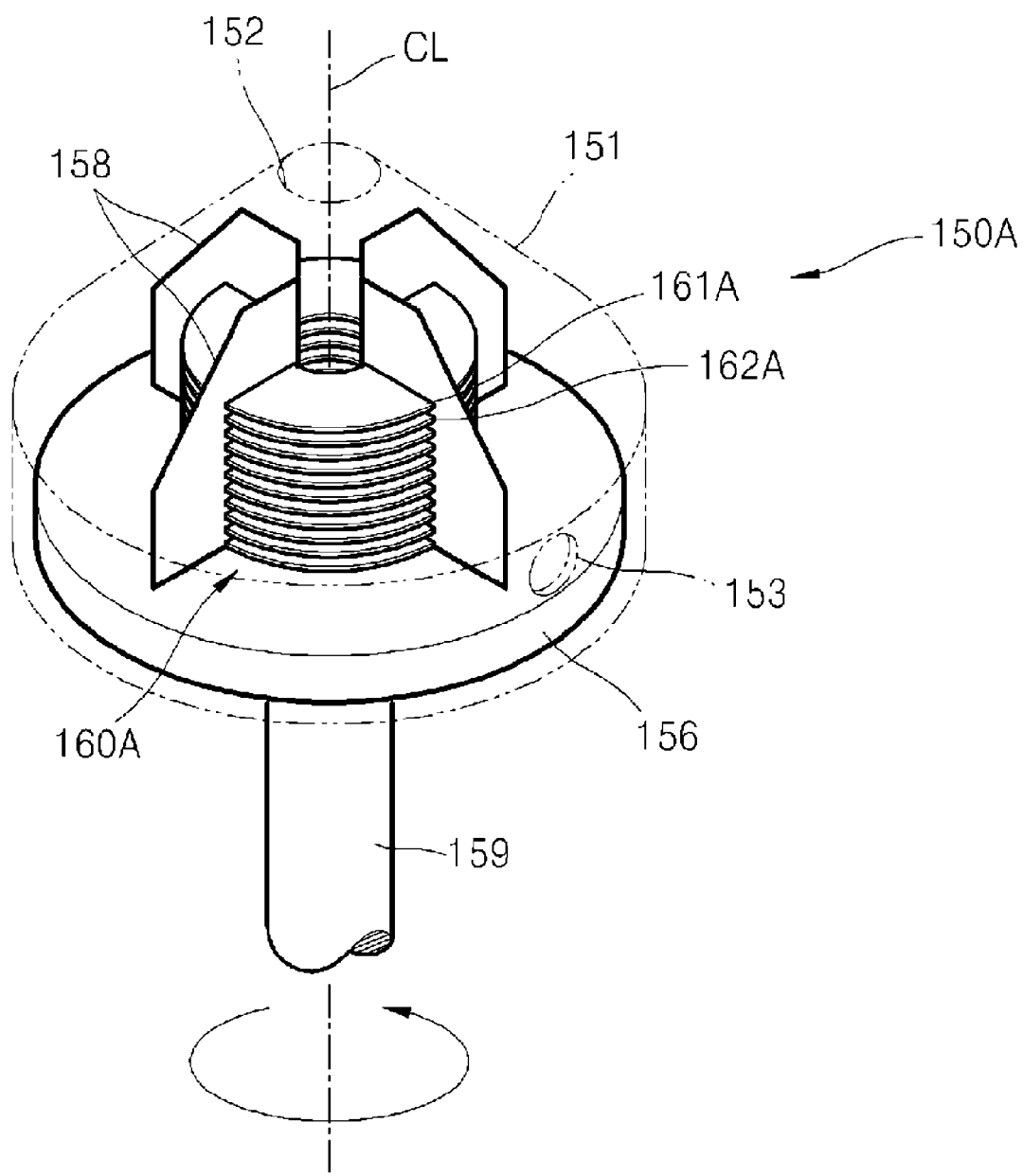
FIG. 5 is a front perspective view of an exemplary embodiment of a soft water forming device installed in the exemplary embodiment of a washing machine of FIG. 4.
Figure 6:
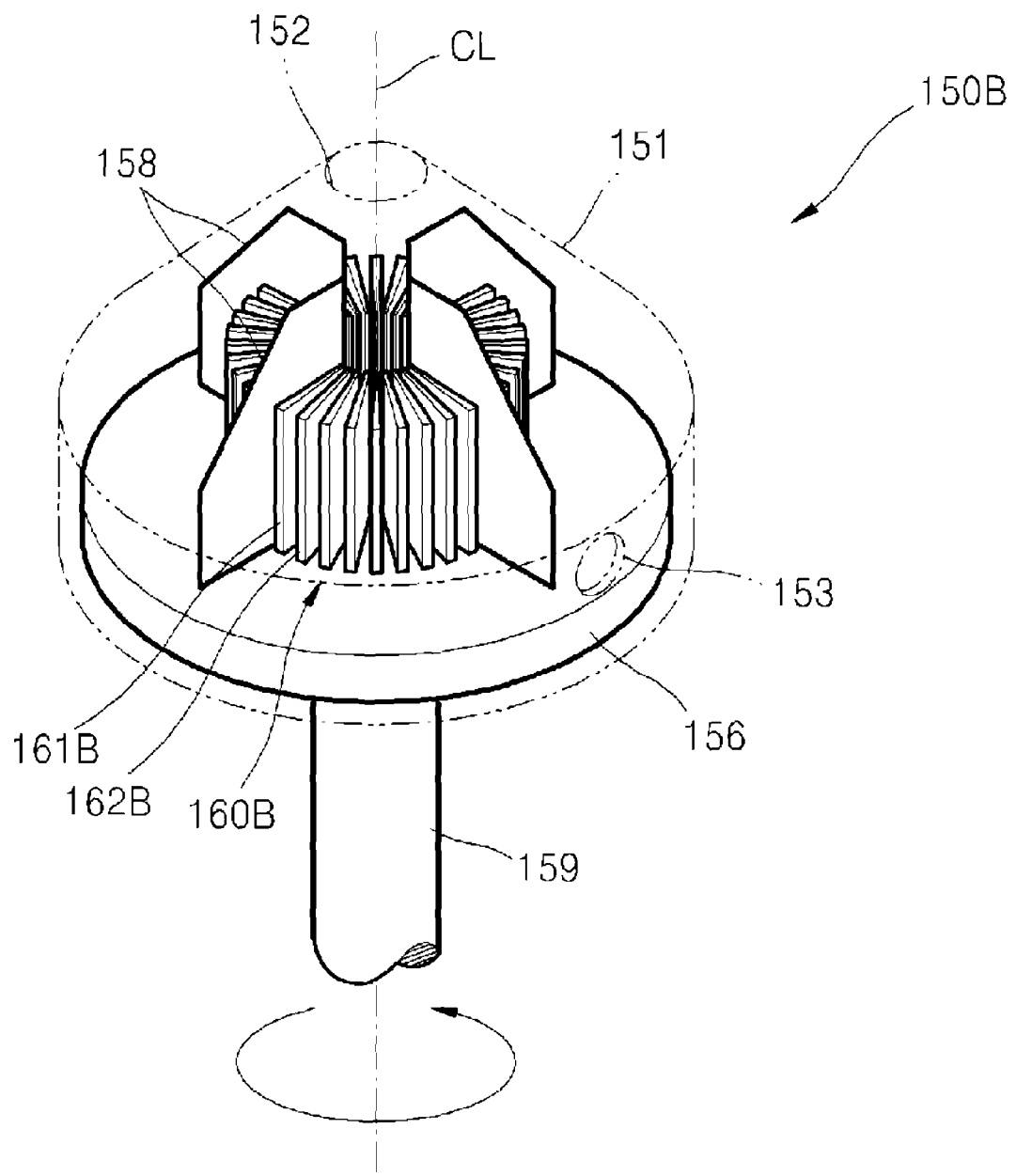
FIG. 6 is a front perspective view of another exemplary embodiment of a soft water forming device installed in the exemplary embodiment of a washing machine of FIG. 4.
Figure 7:
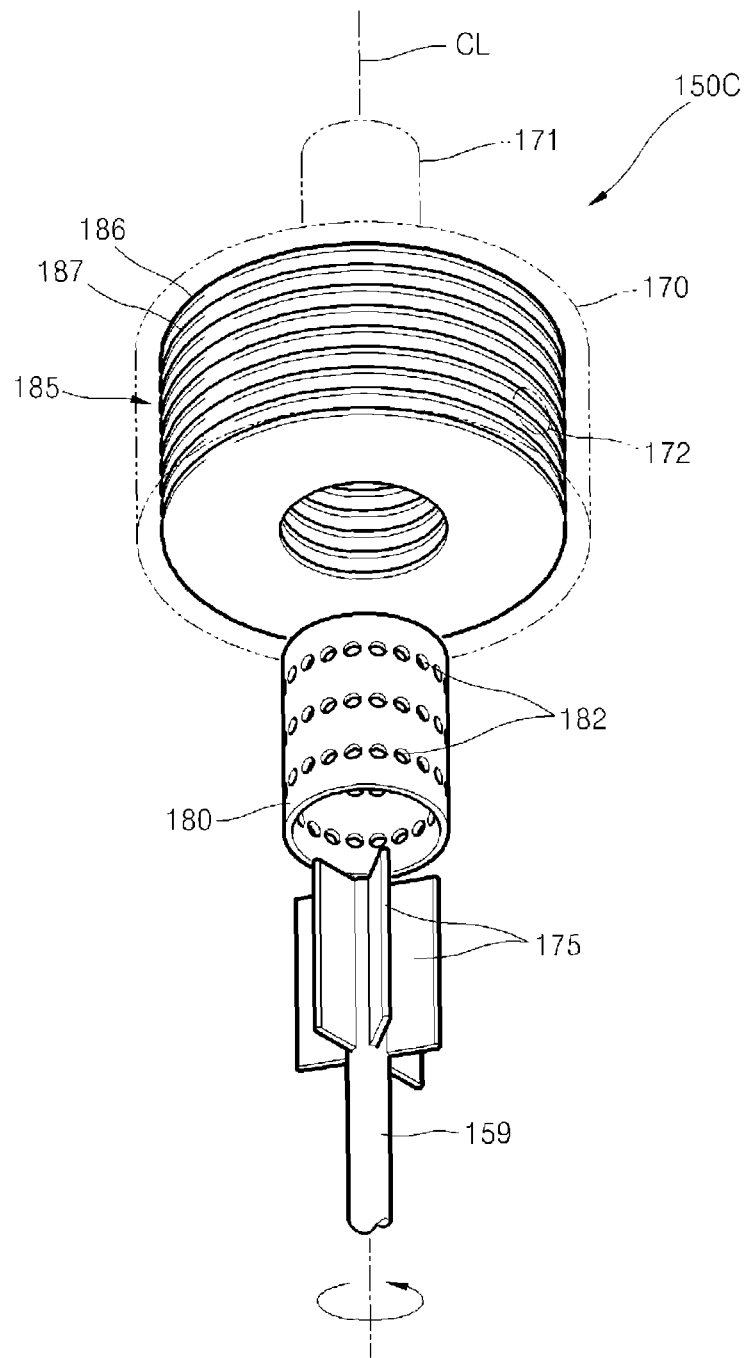
FIG. 7 is an exploded front perspective view illustrating another exemplary embodiment of a soft water forming device.

FIG. 5 is a perspective view of the exemplary embodiment of a soft water forming device 150A installed in the washing machine 10B of FIG. 4. FIG. 6 is a perspective view of another exemplary embodiment of a soft water forming device 150B. FIG. 7 is an exploded front perspective view illustrating another exemplary embodiment of a soft water forming device 150C.

Referring to FIG. 5, the soft water forming device 150A includes a housing 151 having an inlet 152 and an outlet 153 for water, a rotational plate 156 in the housing 151 (shown as a dotted-line), and a plurality of blades 158 that are fixedly supported on the rotational plate 156. The rotational plate 156 is fixedly connected to a second end of the rotational axis 159, whose first end is fixed to the fourth wheel 43 of FIG. 4. The plurality of the blades 158 are rotated around an axis line CL, which is a virtual straight line extended along a rotation center of the rotational axis 159, and are substantially symmetrical around the axis line CL.

The inlet 152 is arranged along the axis line CL, and the outlet 153 is arranged away from the axis line CL compared to the inlet 152. When the motive power of the main motor 30 of FIG. 4 is transmitted to the rotational axis 159 and the rotational axis 159 rotates, and water supplied through the inlet 152 is pumped by agitation power of the blades 158 and is discharged through the outlet 153.

A CDI stack 160A is arranged between the plurality of the blades 158. The CDI stack 160A includes a plurality of anodes 162A and cathodes 161A that are separately and alternately stacked. In the present exemplary embodiment, the anodes 162A and the cathodes 161A are flat plates, and are stacked such that a normal line of the flat plates is substantially parallel to the axis line CL.

When a potential difference is generated between the anodes 162A and the cathodes 161A, ion materials contained in the water are adsorbed toward electrodes having opposite polarity to the ions, and the water is softened due to the ions remaining on the respective electrodes and thus being removed from the water. Accordingly, water is supplied from the outside of the washing machine 10B into the soft water forming device 150A through the inlet 152, and is softened by ion adsorption of the CDI stack 160A. The softened water is discharged through the outlet 153 and is supplied to the washing tub 20 of FIG. 4.

The exemplary embodiment of a soft water forming device 150A of FIG. 5 in the washing machine 10B of FIG. 4 may be replaced with another exemplary embodiment of a soft water forming device 150B illustrated in FIG. 6. The soft water forming device 150B includes a CDI stack 160B arranged between the plurality of the blades 158. The shapes of anodes 162B and cathodes 161B are flat plates. The anodes 162B and the cathodes 161B are stacked such that a normal line of the flat plates is substantially perpendicular to the axis line CL.

Instead of the exemplary embodiments of soft water forming devices 150A and 150B of FIGS. 5 and 6, another exemplary embodiment of a soft water forming device 150C illustrated in FIG. 7 may be installed in the washing machine 10B of FIG. 4. The soft water forming device 150C includes a housing 170 (shown as a dotted line) having an inlet 171 and an outlet 172 for water, and a CDI stack 185 arranged in the housing 170. The CDI stack 185 includes a plurality of anodes 187 and cathodes 186 that are separately and alternately stacked. In the present exemplary embodiment, the anodes 187 and the cathodes 186 are disks having through holes in a center portion. A second end of the rotational axis 159, whose first end is fixed to the fourth wheel 43 of FIG. 4, is extended into the housing 170, and a plurality of blades 175 are fixedly coupled to an outer circumferential surface of the second end of the rotational axis 159. As the rotational axis 159 rotates, the plurality of the blades 175 rotate around the axis line CL which is a virtual substantially straight line and is extended about a rotational center of the rotational axis 159. A cylinder 180 surrounding the blades 175 is formed in the housing 170, and a plurality of openings 182 are formed on an outer circumferential surface of the cylinder 180 so that water pumped in the cylinder 180 can be discharged between the anodes 187 and the cathodes 186.

The inlet 171 is arranged along the axis line CL, and the outlet 172 is arranged away from the axis line CL compared to the inlet 171. When the rotational axis 159 rotates as power from the main motor 30 of FIG. 4 is transmitted thereto, the blades 175 rotate, and water supplied from the outside of the washing machine 10B of FIG. 4 through the inlet 171 and into the cylinder 180 is pumped, and passes through the CDI stack 185 through the openings 182, and is thereby softened. The softened water is discharged through the outlet 153 and supplied to the washing tub 20 (see FIG. 4).

Figure 8:
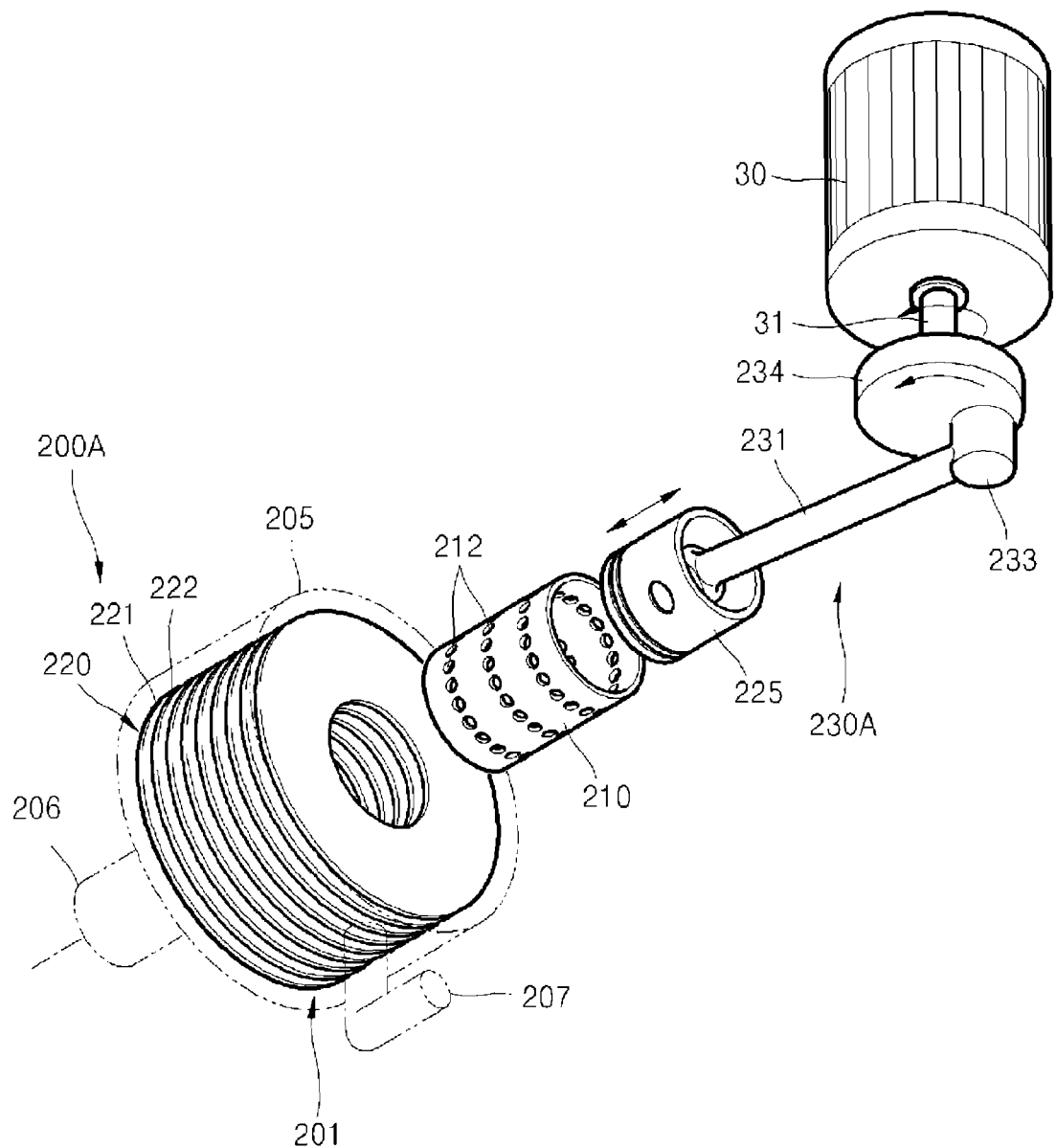
FIG. 8 is an exploded front perspective view illustrating another exemplary embodiment of a soft water forming device.
Figure 9:
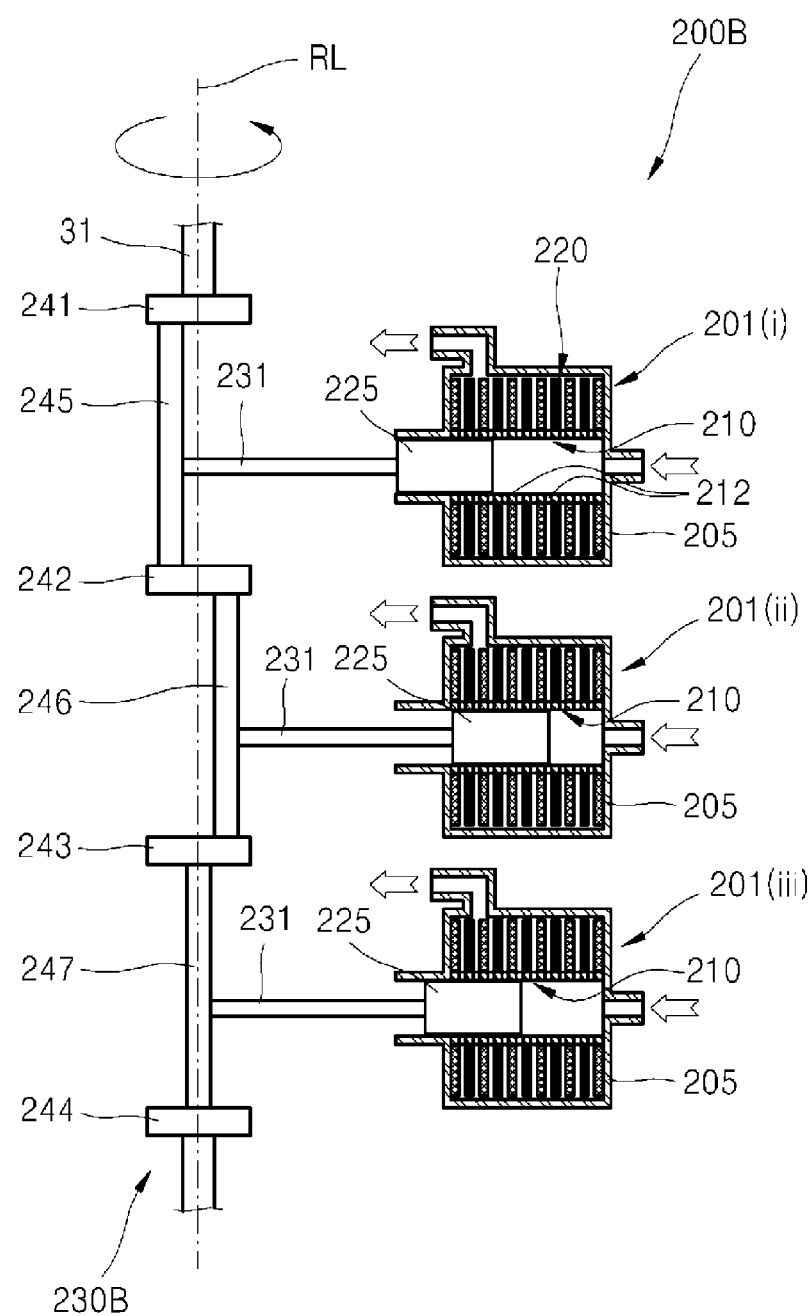
FIG. 9 is a schematic cross-sectional view of another exemplary embodiment of a soft water forming device.

FIG. 8 is an exploded front perspective view illustrating another exemplary embodiment of a soft water forming device 200A. FIGS. 9, 10, 12 and 13 are schematic cross-sectional views of exemplary embodiments of the soft water forming device of FIG. 8, and FIG. 11 is a bottom perspective view of another exemplary embodiment of a soft water forming device.

The soft water forming device 200A of FIG. 8 may be installed in the washing machine 10A (see FIG. 1) instead of the exemplary embodiment of a soft water forming device 100A or 100B of FIGS. 2 and 3. Referring to FIG. 8, the soft water forming device 200A includes a housing 205 (shown as a dotted line) having an inlet 206 and an outlet 207 for water, a cylinder 210 formed in the housing 205, a piston 225 arranged to move reciprocally in the cylinder 210, a soft water forming unit 201 including a CDI stack 220 arranged outside the cylinder 210 in the housing 205, and a power transmitting unit 230A reciprocally moving the piston 225 using power from the main motor 30.

The CDI stack 220 includes a plurality of anodes 222 and cathodes 221 that are separately and alternately stacked. In the present exemplary embodiment, the anodes 222 and the cathodes 221 are disks having through holes in a center portion, and the cylinder 210 is inserted into a space formed by the through holes of the anodes 222 and the cathodes 221. A plurality of openings 212 are formed on an outer circumferential surface of the cylinder 210, through which water pumped in the cylinder 210 are discharged due to the reciprocal movement of the piston 225. The inlet 206 is directly connected to the cylinder 210, and water supplied from the outside of the washing machine 10A through the inlet 206 may be directly supplied into the cylinder 210. The outlet 207 is formed in an outer circumferential surface of the housing 205.

The power transmitting unit 230A includes a rotation plate 234 that is fixedly connected to the rotational axis 31 of the main motor 30 and rotates in synchronization with the rotational axis 31, an eccentric protrusion 233 protruded at an eccentric position from a rotational center of the rotational plate 234, and a connection rod 231, wherein a first end of the connection rod 231 is connected to the eccentric protrusion 233 and a second end of the connection rod 231 is connected to the piston 225. As the rotation plate 234 rotates, the eccentric protrusion 233 is rotated eccentrically, and thus the piston 225 moves reciprocally inside the cylinder 210. The cylinder 210 guides the reciprocal movement of the piston 225.

Due to the reciprocal movement of the piston 225, water supplied from the outside of the washing machine 10A and into the cylinder 210 through the inlet 206 is pumped, and passes through the openings 212 and the CDI stack 220, thereby being softened. Then, the water is discharged through the outlet 207 and is supplied to the washing tub 20 (see FIG. 1).

Meanwhile, another exemplary embodiment of a soft water forming device 200B may be installed instead of the exemplary embodiment of a soft water forming device 200A of FIG. 8. The soft water forming device 200B includes a plurality of soft water forming units 201(i), 201(ii), and 201(iii) arranged substantially linearly. Each of the soft water forming units 201(i), 201(ii), and 201(iii) has substantially the same structure as the soft water forming unit 201 of FIG. 8, and thus detailed description thereof will not be repeated.

A power transmitting unit 230B of the soft water forming device 200B includes first through fourth rotation plates 241, 242, 243, and 244 that coaxially rotate around a virtual axis line RL extended along a rotational center of the rotational axis 31 of the main motor 30 (see FIG. 1), the first through fourth rotation plates including a first eccentric rod 245 connecting the first rotation plate 241 and the second rotation plate 242, a second eccentric rod 246 connecting the second rotation plate 242 and the third rotation plate 243, and a third eccentric rod 247 connecting the third rotation plate 243 and the fourth rotation plate 244. The first through third eccentric rods 245, 246, and 247 are eccentrically arranged from the axis line RL. Also, the motive power transmitting unit 230B includes three connection rods 231 connecting the first through third eccentric rods 245, 246, and 247 and pistons 225 of the first through third soft water forming units 201(i), 201(ii), and 201(iii), respectively.

Accordingly, when the rotational axis 31 rotates, water supplied from the outside of the washing machine 10A (see FIG. 1) can be softened in the three soft water forming units 201(i), 201(ii), and 201(iii), and pumped to be supplied to the washing tub 20 (see FIG. 1). The supply amount of the softened water per unit time may be about three times greater than when a single soft water forming unit 201 is included in the soft water forming device 200A.

Figure 10:
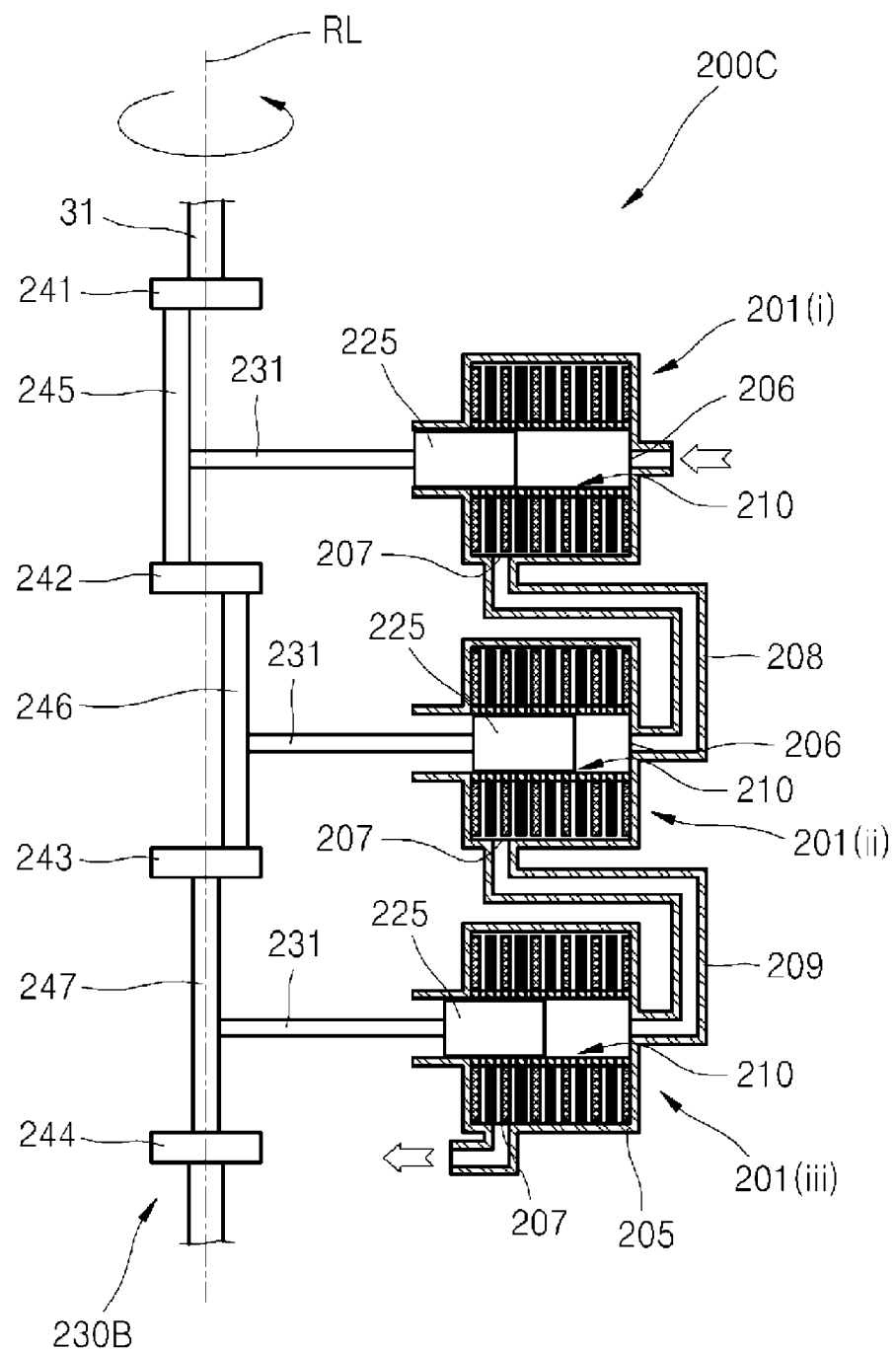
FIG. 10 is a schematic cross-sectional view of another exemplary embodiment of a soft water forming device.
Figure 11:
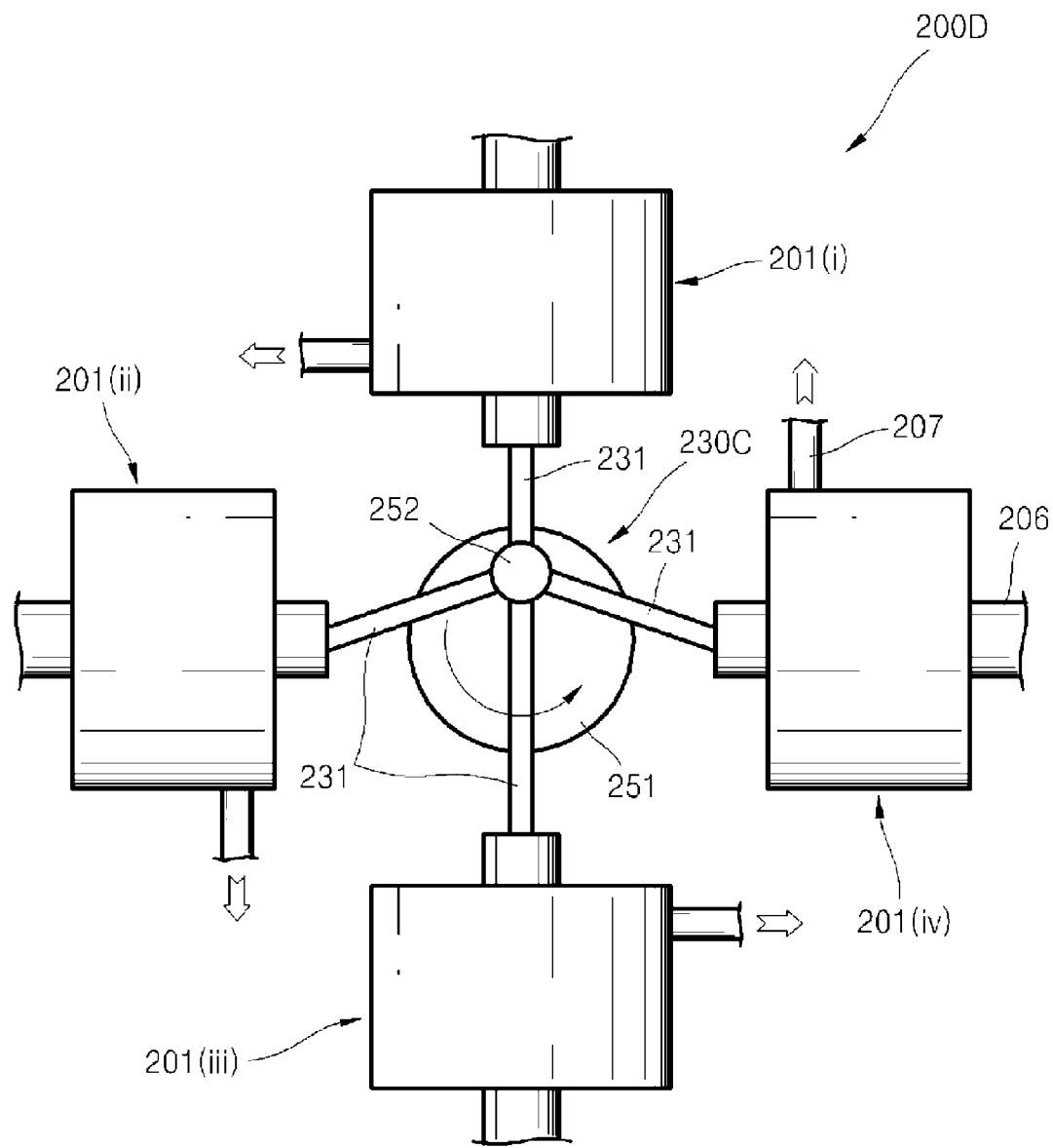
FIG. 11 is a bottom perspective view of another exemplary embodiment of a soft water forming device.

Meanwhile, another exemplary embodiment of a soft water forming device 200C illustrated in FIG. 10 may be installed instead of the exemplary embodiment of a soft water forming device 200A of FIG. 8. The soft water forming device 200C of FIG. 10 includes a plurality of soft water forming units 201(i), 201(ii), and 201(iii) arranged linearly. Each of the soft water forming units 201(i), 201(ii), and 201(iii) has substantially the same structure as the soft water forming unit 201 described with reference to FIG. 8. Also, a power transmitting unit 230B of the soft water forming device 200C has substantially the same structure as the power transmitting unit 230B described with reference to FIG. 9. Thus, repeated description thereof will be omitted.

An outlet 207 of the first soft water forming unit 201(i) is fluidly connected to an inlet 206 of the second soft water forming unit 201(ii), and an outlet 207 of the second soft water forming unit 201(ii) is fluidly connected to an inlet 206 of the third soft water forming unit 201(iii). Thus, when the rotational axis 31 rotates, water supplied from the outside of the washing machine 10A sequentially passes through the first water forming unit 201(i), the second soft water forming unit 201(ii), and the third soft water forming unit 201(iii). Thereby, the water is pumped stepwise and ions in the water are adsorbed in multiple soft water forming units. Accordingly, the water is pumped more intensely compared to when one soft water forming unit 201 is included as in the soft water forming device 200A, and water that is softened more intensely can be supplied to the washing tub 20 (see FIG. 1).

Meanwhile, an alternative exemplary embodiment of a soft water forming device 200D illustrated in FIG. 11 may be installed. The soft water forming device 200D of FIG. 11 includes a plurality of soft water forming units 201(i), 201(ii), 201(iii), and 201(iv) arranged in radial directions around a rotation plate 251. Each of the soft water forming units 201(i), 201(ii), 201(iii), and 201(iv) has substantially the same structure as the soft water forming unit 201 described with reference to FIG. 8.

A power transmitting unit 230C of the soft water forming device 200D includes the rotation plate 251 that coaxially rotates with the rotational axis 31 of the main motor 30 (see FIG. 1), an eccentric protrusion 252 that is attached to the rotation plate 251 to rotate eccentrically with respect to a rotation center of the rotation plate 251, and connection rods 231 of a number corresponding to a number of the soft water forming units 201(i), 201(ii), 201(iii), and 201(iv), wherein a first end of the connection rods 231 is connected to the eccentric protrusion 252 and a second end of the connection rods 231 is connected to pistons 225 (see FIG. 8) of the first through fourth soft water forming units 201(i), 201(ii), 201(iii), and 201(iv). Accordingly, when the rotational axis 31 of the main motor 30 rotates, water supplied from the outside of the washing machine 10A (see FIG. 1) can be softened in the first through fourth soft water forming devices 201(i), 201(ii), 201(iii), and 201(iv), and is pumped to be supplied to the washing tub 20 (see FIG. 1). The supply amount of the softened water per time unit may be about four times greater than when a single soft water forming unit 201 is included as in the soft water forming device 200A. Although not shown, alternative exemplary embodiments include configurations wherein the outlet pipes of the first soft water forming unit 201(i) is connected to an inlet pipe of a second soft water forming unit 201(ii), and the third and fourth soft water forming units 201(iii) and 201(iv) are similarly interconnected in order to increase the intensity of the removal of the hard water ions, similar to the arrangement shown in FIG. 10.

Figure 12:
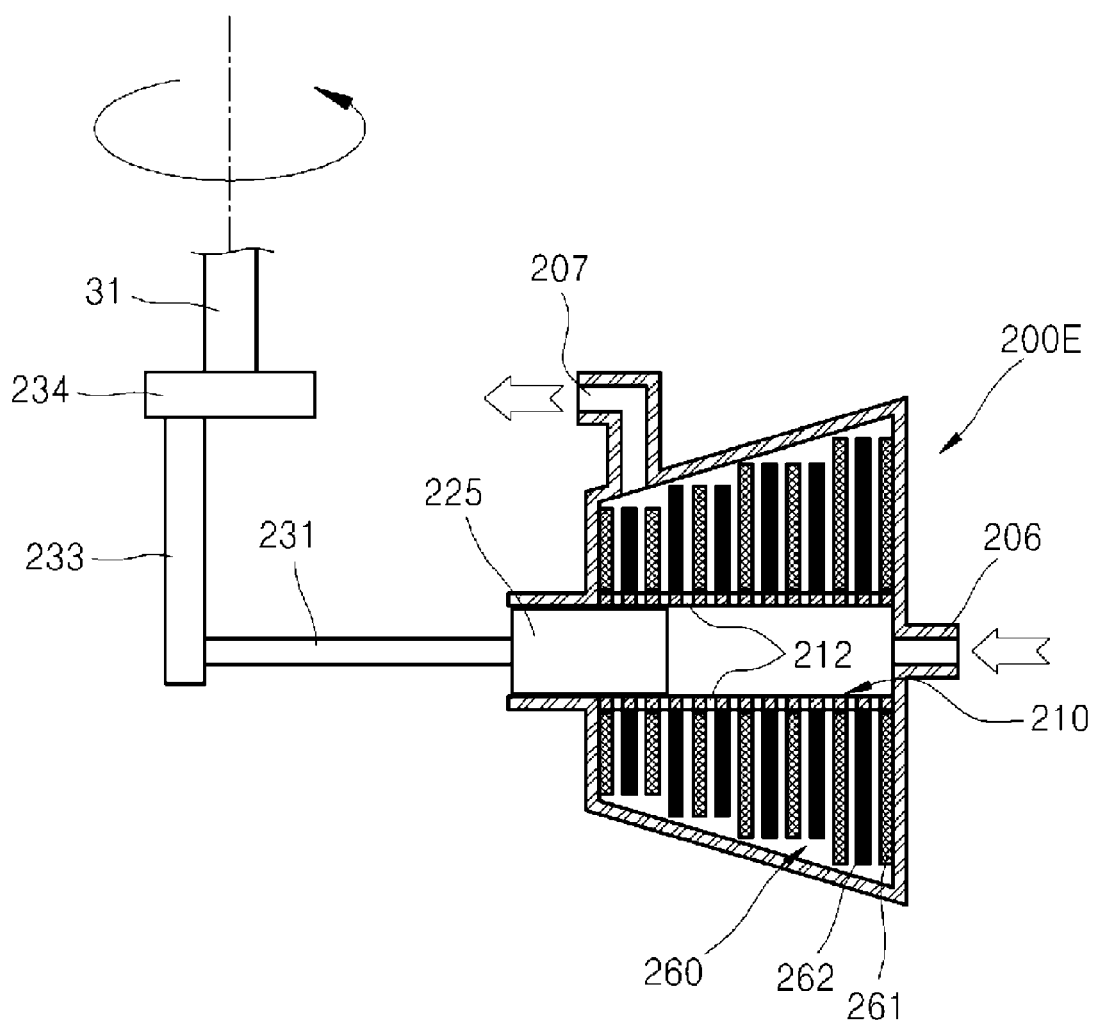
FIG. 12 is a schematic cross-sectional view of another exemplary embodiment of a soft water forming device.

Meanwhile, another exemplary embodiment of a soft water forming device 200E illustrated in FIG. 12 may be installed. In the soft water forming device 200E, a planar area of the anode 262 or the cathode 261 disposed closer to the inlet is larger than or equal to a planar area of the anode 262 or the cathode 261 disposed a greater distance away from the inlet 206. Water is sucked toward the inlet 206 in the cylinder 210 due to the reciprocal movement of a piston 225. Accordingly, the amount of water discharged through openings 212 near the inlet 206 is greater than the amount of water discharged through openings 212 disposed farther from the inlet 206. Thus, the planar area of the anode 262 or the cathode 261 disposed closer to the inlet 206 is set to be larger than the planar area of the anode 262 or the cathode 261 disposed farther from the inlet 206, thereby increasing the ion adsorption of a CDI stack 260.

Figure 13:
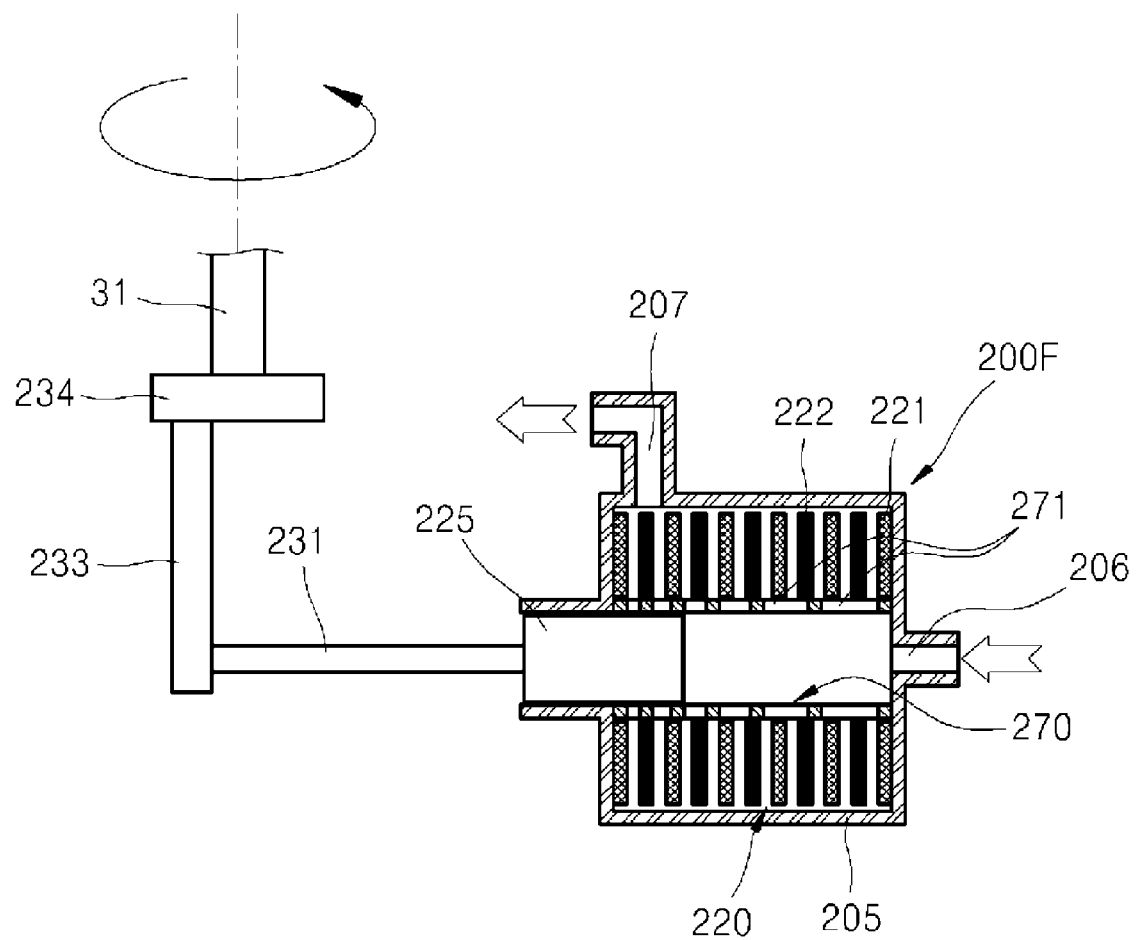
FIG. 13 is a schematic cross-sectional view of another exemplary embodiment of a soft water forming device of FIG. 8.

Meanwhile, another exemplary embodiment of a soft water forming device 200F illustrated in FIG. 13 may be installed. The soft water forming device 200F includes a cylinder 270 guiding the reciprocal movement of a piston 225 in a housing 205, and a plurality of openings 271 through which water pumped by the piston 225 is discharged and which are formed on an outer circumferential surface of the cylinder 270. In the soft water forming device 200F, a diameter of the openings 271 closer to the inlet 206 is larger than or equal to a diameter of the openings 271 disposed farther from the inlet 206.

The water is sucked toward the inlet 206 in the cylinder 270 due to the reciprocal movement of the piston 225. Accordingly, the diameter of the opening 271 closer to the inlet 206 is set to be larger than or equal to the diameter of the opening 271 disposed farther from the inlet 206 so that water pumped in the cylinder 270 is easily discharged to a CDI 220, thereby increasing the efficiency of water softening.

By pumping water through the soft water forming units, exemplary embodiments ensure that water pressure is maintained even downstream of the soft water forming units.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A soft water forming device comprising:
    a capacitive deionization stack including a plurality of anodes and a plurality of cathodes which are separately and alternately stacked configured to adsorb ions contained in water; and
    a pumping unit which pumps one of water supplied to the capacitive deionization stack and water which has passed through the capacitive deionization stack while reducing water pressure drop through the capacitive deionization stack, the pumping unit comprising:
        a casing having a water inlet and a water outlet; and
        a rotor which rotates due to motive power supplied by an external motor and pumps the water supplied into the casing.

2. A soft water forming device comprising:
    a housing having a water inlet and a water outlet;
    a plurality of blades which are arranged in the housing, rotate due to motive power supplied by an external motor, and pump water supplied into the housing; and
    a capacitive deionization stack that is arranged in the housing and includes a plurality of anodes and a plurality of cathodes that are separately and alternately stacked configured to adsorb ions contained in the water,
    wherein the plurality of blades reduce water pressure drop through the capacitive deionization stack.

3. The soft water forming device of claim 2, wherein the anodes and the cathodes are flat plates, and a normal line of the flat plates is one of substantially parallel to an axis line around which the blades rotate and substantially perpendicular to the axis line around which the blades rotate.

4. The soft water forming device of claim 2, wherein the capacitive deionization stack is arranged in one of a configuration between the plurality of the blades and a configuration outside the plurality of the blades.

5. The soft water forming device of claim 2, wherein the water outlet is arranged away from the axis line around which the blades rotate, compared to the water inlet.

6. A soft water forming device comprising:
    at least one soft water forming unit comprising:
        a housing having a water inlet and a water outlet;
        a cylinder arranged in the housing;
        a piston which is arranged in the cylinder and which pumps water that is supplied into the cylinder to discharge the water outside the cylinder; and
        a capacitive deionization stack which is arranged outside the cylinder and includes a plurality of anodes and a plurality of cathodes separately and alternately stacked configured to adsorb ions contained in the water; and
    a motive power transmitting unit which reciprocally moves the piston via an external motor,
    wherein the piston reduces water pressure drop through the capacitive deionization stack.

7. The soft water forming device of claim 6, wherein a plurality of openings, through which the water pumped in the cylinder are discharged, are formed on an outer circumferential surface of the cylinder.

8. The soft water forming device of claim 6, wherein the inlet is directly connected to the cylinder.

9. The soft water device of claim 8, wherein a planar area of at least one of the anode and cathode disposed closer to the inlet is larger than or equal to a planar area of at least one additional anode or cathode disposed a greater distance away from the inlet.

10. The soft water forming device of claim 8, wherein a plurality of openings, through which water pumped in the cylinder is discharged, are formed on an outer circumferential surface of the cylinder, and a diameter of an opening disposed closer to the inlet is greater than or equal to a diameter of an opening disposed a greater distance away from the inlet.

11. The soft water forming device of claim 6, wherein the soft water forming device includes a plurality of soft water forming units, and the plurality of soft water forming units are arranged substantially linearly.

12. The soft water forming device of claim 11, wherein an outlet of one soft water forming unit and an inlet of another soft water forming unit that is disposed adjacent to the one soft water forming unit are fluidly connected to each other so that water sequentially passes through the plurality of the soft water forming units and is pumped stepwise, and ions are adsorbed sequentially in each of the plurality of soft water forming units.

13. The soft water forming device of claim 6, wherein the soft water forming device includes a plurality of soft water forming units arranged in radial directions with respect to a rotation center, and the motive power transmitting unit includes an eccentric protrusion which rotates with respect to the rotation center and a plurality of connection rods individually corresponding to an individual soft water forming unit of the plurality of soft water forming units, wherein a first end of the connection rods is connected to the eccentric protrusion, and a second end of the connection rods is connected to the piston of each of the plurality of soft water forming units.

14. A washing machine comprising:
    a washing tub including an internal space accommodating a washing object and water;
    a main motor which rotates the washing tub; and
    a soft water forming device comprising:
        a capacitive deionization stack including a plurality of anodes and a plurality of cathodes that are separately and alternately stacked configured to adsorb ions contained in water; and
        a pumping unit which pumps one of water supplied to the capacitive deionization stack and water which has passed through the capacitive deionization stack while reducing water pressure drop through the capacitive deionization stack, the pumping unit comprising:
            a casing having a water inlet and a water outlet; and
            a rotor which rotates due to motive power supplied by an external motor and pumps the water supplied into the casing,
    wherein the main motor is the external motor.

* * * * *